(12) United States Patent
Labastie et al.

(10) Patent No.: US 9,688,417 B2
(45) Date of Patent: Jun. 27, 2017

(54) METHOD AND DEVICE FOR AUTOMATICALLY DETERMINING A SPEED PROFILE WITH SPEED LEVELS FOR AN AIRCRAFT

(71) Applicant: AIRBUS OPERATIONS (SAS), Toulouse (FR)

(72) Inventors: Marine Labastie, Toulouse (FR); Adriana Gomez-Zamora, Blagnac (FR)

(73) Assignee: Airbus Operations (S.A.S.), Toulouse (FR)

( * ) Notice: Subject to any disclaimer, the term of this patent is extended or adjusted under 35 U.S.C. 154(b) by 42 days.

(21) Appl. No.: 14/559,142

(22) Filed: Dec. 3, 2014

(65) Prior Publication Data
US 2015/0151849 A1    Jun. 4, 2015

(30) Foreign Application Priority Data
Dec. 4, 2013 (FR) ...................................... 13 62113

(51) Int. Cl.
*B64D 43/02*    (2006.01)
*G08G 5/00*     (2006.01)
*G05D 1/06*     (2006.01)

(52) U.S. Cl.
CPC ........... *B64D 43/02* (2013.01); *G05D 1/0676* (2013.01); *G08G 5/0021* (2013.01)

(58) Field of Classification Search
CPC ..... B64D 43/02; G05D 1/0676; G08G 5/0021
USPC ......................................................... 701/7, 3
See application file for complete search history.

(56) References Cited

U.S. PATENT DOCUMENTS

| | | | | |
|---|---|---|---|---|
| 4,633,404 A * | 12/1986 | Greeson | ............... | G05D 1/0676 244/180 |
| 4,825,374 A * | 4/1989 | King | ................... | G05D 1/0676 244/186 |
| 5,445,021 A * | 8/1995 | Cattoen | ............... | G05D 1/0607 244/186 |
| 6,334,344 B1 * | 1/2002 | Bonhoure | .............. | G05D 1/101 244/190 |
| 7,512,464 B2 * | 3/2009 | Tarleton | ............... | G05D 1/0005 244/182 |
| 8,447,442 B2 * | 5/2013 | Sacle | ................... | G05D 1/0676 244/76 R |
| 8,615,337 B1 * | 12/2013 | McCusker | ............. | G01C 21/20 701/1 |
| 8,655,506 B2 * | 2/2014 | Gomez | .................. | G01C 21/00 701/3 |

(Continued)

OTHER PUBLICATIONS

Search Report for FR 1362113 dated Oct. 2, 2014, 2 pages.

*Primary Examiner* — Fadey Jabr
*Assistant Examiner* — Angelina Shudy
(74) *Attorney, Agent, or Firm* — Nixon & Vanderhye P.C.

(57) ABSTRACT

A method and device for automatically determining a speed profile with speed levels for an aircraft.
The device includes a calculation unit which is configured for determining a speed profile (P1) which is such that, from upstream to downstream, the speed (V) is maintained at a speed constraint (V1) imposed at a waypoint (B1), up to said waypoint (B1), then a deceleration (T2) is performed from this waypoint (B1) up to an optimum speed (Vopt), said optimum speed (Vopt) being maintained up to another deceleration (T4) ending directly at a downstream speed limit (V2) reached at a given altitude level (A2).

18 Claims, 1 Drawing Sheet

(56) References Cited

U.S. PATENT DOCUMENTS

Figure 1:
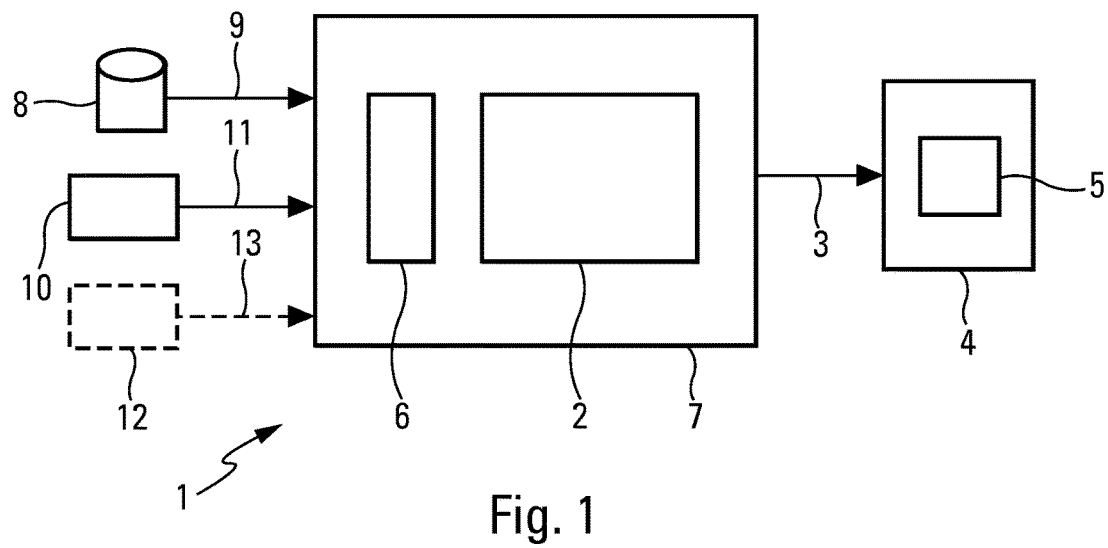

| | | | | |
|---|---|---|---|---|
| 8,688,363 B2* | 4/2014 | Svoboda | G05D 1/0607 | 701/121 |
| 8,781,654 B2* | 7/2014 | Giovannini | G08G 5/0021 | 701/1 |
| 8,892,275 B2* | 11/2014 | Constans | G08G 5/025 | 701/4 |
| 9,026,275 B1* | 5/2015 | Young | G08G 5/003 | 701/11 |
| 9,142,135 B2* | 9/2015 | Le Gall | G08G 5/02 | |
| 9,193,442 B1* | 11/2015 | Young | B64C 19/00 | |
| 9,442,490 B2* | 9/2016 | Mn | G05D 1/0676 | |
| 9,536,435 B1* | 1/2017 | Shay | G08G 5/045 | |
| 2005/0143904 A1* | 6/2005 | Haas | G05D 1/105 | 701/120 |
| 2005/0261812 A1* | 11/2005 | Artini | G01C 23/005 | 701/16 |
| 2006/0273928 A1* | 12/2006 | Van Boven | G05D 1/0676 | 340/945 |
| 2008/0243318 A1* | 10/2008 | Ferro | G01C 23/00 | 701/11 |
| 2008/0262665 A1* | 10/2008 | Coulmeau | G08G 5/0039 | 701/16 |
| 2008/0300736 A1* | 12/2008 | Tarleton | G05D 1/0005 | 701/3 |
| 2008/0312779 A1* | 12/2008 | Sacle | G01C 23/005 | 701/7 |
| 2009/0259351 A1* | 10/2009 | Wachenheim | G05D 1/0202 | 701/7 |
| 2010/0114407 A1* | 5/2010 | Klooster | G05D 1/0005 | 701/3 |
| 2011/0077858 A1* | 3/2011 | Coulmeau | G05D 1/101 | 701/465 |
| 2011/0118908 A1* | 5/2011 | Boorman | G08G 5/0021 | 701/14 |
| 2011/0270470 A1* | 11/2011 | Svoboda | G05D 1/0607 | 701/3 |
| 2012/0059535 A1* | 3/2012 | Jackson | G05D 1/101 | 701/3 |
| 2013/0030611 A1 | 1/2013 | Constans et al. | | |
| 2013/0226373 A1* | 8/2013 | Bollapragada | G08G 5/0039 | 701/3 |
| 2014/0172204 A1* | 6/2014 | Coulmeau | G01C 23/005 | 701/14 |
| 2014/0288732 A1* | 9/2014 | Labastie | G05D 1/0676 | 701/11 |
| 2014/0343760 A1* | 11/2014 | Le Gall | G08G 5/02 | 701/4 |
| 2015/0120100 A1* | 4/2015 | Sacle | G01C 21/20 | 701/18 |
| 2015/0148999 A1* | 5/2015 | Mere | G05D 1/00 | 701/3 |
| 2016/0085239 A1* | 3/2016 | Boyer | G08G 5/0021 | 701/5 |

* cited by examiner

METHOD AND DEVICE FOR AUTOMATICALLY DETERMINING A SPEED PROFILE WITH SPEED LEVELS FOR AN AIRCRAFT

This application claims priority to French Patent Application No. 13 62113 filed 4 Dec. 2013, the entire contents of which is hereby incorporated by reference.

The present invention relates to a method and a device for automatically determining a speed profile with a view to a descent and/or an approach for an aircraft.

It is known that, for constructing a descent and/or an approach profile of an aircraft, in particular a transport airplane, particularly with a view to a landing on an airport runway, an aircraft Flight Management System (FMS), determines an optimized vertical profile, by making an upstream, i.e. backward, calculation. This vertical profile includes a speed profile (indicating a variation in the speed of the aircraft as a function of distance, in particular with respect to the runway threshold) and an altitude profile (indicating a variation in the altitude of the aircraft also as a function of said distance).

The backward calculation of the vertical profile is performed from a calculation starting point, namely the runway threshold or, according to the type of approach e.g. a conventional point (such as a 'missed approach point' or a 'final end point'), and up to a calculation end point, e.g. the last cruise flight level. The calculation of the vertical profile is performed, in a conventional manner, by the flight management system taking into account speed and/or altitude limits inserted in the flight plan. The speed profile of the vertical profile includes a series of constant speed levels and deceleration segments.

The aircraft will in principle be guided during the descent and/or the approach to follow this vertical profile.

Furthermore, during the flight, it could be provided that the aircraft has to respect a particular speed constraint at a given waypoint of the descent or of the approach, imposed, for example, by an air traffic controller, and in particular a constraint:

of the 'AT' type, for which the speed at a given waypoint of the lateral flight path, must display a speed value equal to the speed constraint considered; or of the 'AT or ABOVE' type, for which the speed at a given waypoint of the lateral flight path, must display a speed value equal to or greater than the speed constraint considered.

However, currently there are no means for automatically inserting such a speed constraint of the 'AT' type or the 'AT or ABOVE' in a conventional speed profile determined as above.

The present invention aims to remedy this drawback. It relates to a method for automatically determining at least one speed profile with a view to a descent and/or an approach for an aircraft in flight.

According to the invention, said method, according to which the speed profile includes a series of constant speed levels and deceleration segments and is backwardly determined from a calculation starting point, said speed profile being transmitted to at least one user device, is wherein it further includes a series of steps consisting of:

a) receiving at least one speed constraint, of the 'AT' type or of the 'AT or ABOVE' type, for a given waypoint, the aircraft having to fly at least at a speed corresponding to this speed constraint at said waypoint; and b) determining at least one portion of the speed profile upstream and downstream of said waypoint, by backwardly defining an acceleration (which corresponds to a deceleration flown by the aircraft) from a downstream speed limit (either a speed restriction, or a speed related to a deceleration capacity up to the runway) imposed at a given altitude level up to an optimum speed which is maintained up to a new acceleration, this new acceleration ending directly at said speed constraint at said given waypoint so that said portion of the speed profile is such that, from upstream to downstream, the speed is maintained at said speed constraint up to said waypoint, then a deceleration is performed from said waypoint up to the optimum speed, said optimum speed being maintained up to another deceleration ending directly at said downstream speed limit reached at said given altitude level.

Thus, thanks to the invention, there is a method for automatically inserting a speed constraint of the 'AT' type or the 'AT or ABOVE' type, into a speed profile. To this end, the speed constraint is maintained only until the given waypoint, then a direct deceleration is performed to end in an optimum speed that is maintained as long as possible (up to having to perform a new deceleration for finally ending directly at said speed limit at said given altitude level). Altitude level means an altitude or a height above the ground or a position in space (located at a certain altitude or height above the ground).

Advantageously, said optimum speed is a speed for optimizing at least one particular cost index, in particular fuel consumption, and/or flight time. As, thanks to the invention, the optimum speed is maintained as long as possible, the speed profile obtained can be used to optimize the criterion or criteria taken into account in the cost index used for calculating this optimum speed.

Moreover, advantageously, the method determines a vertical profile including, in addition to the speed profile, an altitude profile determined simultaneously with said speed profile.

Furthermore, advantageously, at step a), said speed constraint may:

be received automatically from an onboard database; and/or be input by a pilot of the aircraft; and/or be received automatically from a control station external to the aircraft, via a data transmission link.

The present invention also relates to a device for automatically determining at least one speed profile with a view to a descent and/or an approach for an aircraft, the speed profile including a series of constant speed levels and deceleration segments.

According to the invention, said device of the type comprising a calculation unit configured for backwardly determining the speed profile from a calculation starting point and a data transmission unit configured for transmitting the speed profile to at least one user device, is wherein it further comprises at least one data receiving unit configured for receiving at least one speed constraint for a given waypoint, the aircraft having to fly at least at a speed corresponding to this speed constraint at said waypoint, and in that said calculation unit is configured for determining at least one portion of the speed profile upstream and downstream of said waypoint, by backwardly defining an acceleration from a downstream speed limit imposed at a given altitude level up to an optimum speed which is maintained up to a new acceleration, this new acceleration ending directly at said speed constraint at said given waypoint so that said portion of the speed profile is such that, from upstream to downstream, the speed is maintained at said speed constraint up to said waypoint, then a deceleration is performed from said waypoint up to the optimum speed, said optimum speed being maintained (as long as possible) up to another deceleration ending directly at said downstream speed limit reached at said given altitude level.

Advantageously, said device further comprises a display unit for displaying said speed profile.

The present invention further relates to:
a flight management system, which includes such a device for automatically determining a speed profile; and
an aircraft, in particular a transport airplane, which is provided with a system and/or a device such as those mentioned above.

The figures in the accompanying drawing will elucidate how the invention may be implemented In these figures, identical references denote similar elements.

FIG. 1 is a block diagram of a device for automatically determining a speed profile, illustrating one embodiment of the invention.

Figure 2:
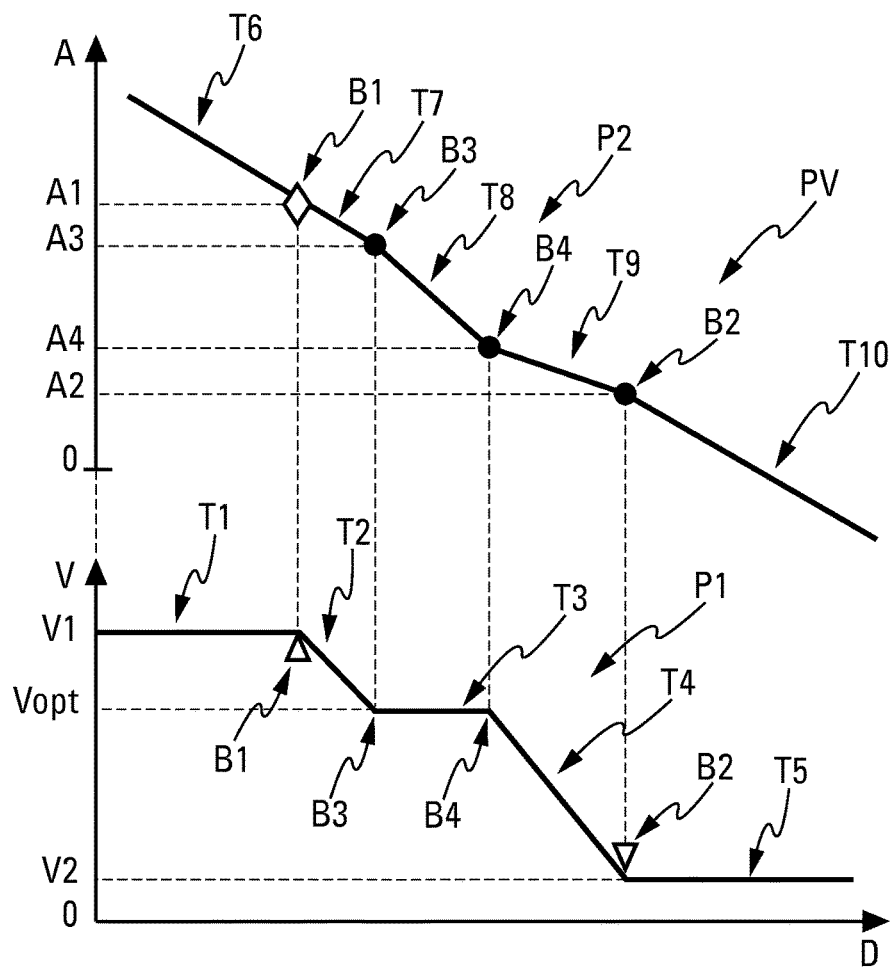

FIG. 2 schematically shows a vertical profile including a speed profile and an altitude profile.

The device 1 shown schematically in FIG. 1 for illustrating the invention, is intended to automatically determine (or construct) at least one speed profile P1 with a view to a descent and/or an approach for an aircraft (not shown), in particular a civil transport airplane, flying along a lateral flight path (not shown) including waypoints.

More precisely, the device 1 is configured for constructing a vertical profile PV (FIG. 2) including in a conventional manner, in addition to the speed profile P1, an altitude profile P2 constructed simultaneously with said speed profile P1.

To do this, the device 1 for automatically determining at least one speed profile P1, which is on board the aircraft, comprises:
a calculation unit 2 which is configured for backwardly determining (or constructing) at least one speed profile P1 from a calculation starting point (not shown); and
a data transmission unit (including, for example, a link 3) which is configured for transmitting the speed profile P1 (and the altitude profile P2) to a user device assembly 4.

This assembly 4 may comprise an aircraft guidance system, in particular an automatic pilot system and/or a flight director, which uses a vertical profile for guiding or helping to guide the aircraft. Preferably, the assembly 4 comprises, at least, one display unit for 5 for displaying at least the speed profile P1 constructed by the calculation unit 2.

The calculation unit 2 is formed so as to construct a vertical profile PV including a speed profile P1 and an altitude profile P2. The vertical profile PV thus includes, as shown in FIG. 2:
a speed profile P1 indicating a variation in the speed V of the aircraft as a function of distance D, in particular with respect to the runway threshold (not shown) on which the pilot intends to land. This speed profile P1 includes a series of constant speed levels (T1, T3) and deceleration segments (T2, T4); and
an altitude profile P2 indicating a variation in the altitude A of the aircraft, also as a function of said distance D and including a plurality of straight (descent) segments T6, T7, T8, T9, T10 with different gradients.

In FIG. 2, the profiles P1 and P2 are shown in a superimposed manner, being aligned on the abscissa as a function of the distance D.

According to the invention, the device 1 further comprises at least one data receiving unit 6 which is configured for receiving at least one speed constraint V1 for a given waypoint B1, namely a speed constraint of the 'AT' type or of the 'AT or ABOVE' type, the aircraft therefore having to fly at least at a speed corresponding to this speed constraint V1 at said waypoint B1.

In addition, according to the invention, said calculation unit 2 is configured for determining (or constructing) at least one portion of the speed profile P1 upstream and downstream of said waypoint B1 (of altitude A1), by backwardly defining an acceleration (corresponding to a deceleration flown by the aircraft) from a downstream speed limit V2 (imposed at a given altitude level A2) up to an optimum speed Vopt, which is maintained up to a new acceleration, this new acceleration ending directly at said speed constraint V1 directly at said given waypoint B1.

This construction of said portion of the speed profile P1 is such that, from upstream to downstream (i.e. from left to right in FIG. 2):
the speed V is maintained at said speed constraint V1 (e.g. 300 knots) up to said waypoint B1;
then a deceleration (illustrated by a segment T2 in FIG. 2) is performed from said waypoint B1 up to the optimum speed Vopt (reached at a point B3 of altitude A3 between A1 and A2);
the optimum speed Vopt is maintained as long as possible up to another deceleration (illustrated by a segment T4 and starting at a point B4 of altitude A4 between A3 and A2); and
this last deceleration ends directly at said downstream speed limit speed V2 (e.g. 250 knots) which is reached at said given altitude level A2 (corresponding to a point B2 on the flight path).

In a preferred embodiment, units 2 and 6 are integrated into a central processing unit 7, preferably forming part of an FMS (Flight Management System) for the aircraft. Similarly, preferably, the display unit 5 may also form part of the FMS.

Thus, thanks to the invention, the speed constraint V1 is maintained only up to the given waypoint B1, then a deceleration (illustrated by the segment T2) is performed for ending at the optimum speed Vopt that is maintained as long as possible, and finally a new deceleration is performed (illustrated by the segment T4) for ending directly at the speed limit V2 at said given altitude level A2 (e.g. 10 000 feet). Altitude level means an altitude A2 or a height above the ground, or a position B2 (located at a certain altitude A2 or height above the ground).

Said optimum speed Vopt is a speed for optimizing a particular cost index, in particular fuel consumption and/or noise and it is calculated in a conventional manner.

As, thanks to the invention, the optimum speed Vopt is maintained as long as possible, the speed profile P1 obtained can be used to optimize the criterion or criteria taken into account in the cost index used for calculating this optimum speed Vopt. In particular, this speed profile P1 can be used to optimize fuel consumption, fuel consumption being reduced if the deceleration is performed at lower altitude.

In the context of the present invention, said speed constraint V1 may be received in different ways by the data receiving unit 6.

In a first embodiment, the speed constraint V1 is recorded in a database 8 of the device 1, and it is received automatically from the database 8 via a link 9. In a variant embodiment, said database 8 may be integrated directly into the central processing unit 7.

Furthermore, in a second embodiment, said speed constraint V1 is input by a pilot of the aircraft, using an input unit 10, e.g. a keyboard associated with a display, which is connected via a link 11 to the central processing unit 7. Such an input of a speed constraint V1 may be performed, in particular, after air traffic control has provided the aircraft's pilot with this speed constraint V1 orally.

Moreover, in a third embodiment, said speed constraint V1 is received automatically by the device 1 on board the aircraft, after having been issued from a control station external to the aircraft, in particular from an air traffic control station, with the aid of a conventional transmitter 12 (not on board the aircraft and shown in broken lines in FIG. 1 for this reason) and transmitted via a data transmission link 13 (between the external station and the aircraft).

The invention claimed is:

1. A method for constructing at least one speed profile (P1) for a descent or an approach of an aircraft looking to land, the speed profile (P1) including a series of constant speed levels (T1, T3, T5) and deceleration segments (T2, T4) along a flight path of the aircraft and being determined for a part of the flight path of the aircraft upstream from a calculation starting point corresponding to the aircraft travelling downstream along the flight path at a downstream speed limit (V2) at a given altitude level (A2) above ground, the method comprising:
   a) receiving at least one speed constraint (V1) for a given waypoint (B1) along the aircraft flight path, the at least one speed constraint (V1) requiring the aircraft to fly at the waypoint (B1) at least at a speed corresponding to the speed constraint (V1);
   b) determining at least one portion of the speed profile (P1) upstream of the waypoint (B1), by defining, a first acceleration upstream along the aircraft flight path from the downstream speed limit (V2) imposed at the given altitude level (A2) above ground up to an optimum speed (Vopt) for optimizing a cost index for operation of the aircraft, the first acceleration upstream corresponding to a second deceleration (T4) flown by the aircraft from the optimum speed (Vopt) down to the downstream speed limit (V2),
   c) maintaining the optimum speed (Vopt) upstream along the aircraft flight path up to a defined second acceleration upstream along the aircraft flight path from the optimum speed (Vopt) directly up to the speed constraint (V1) at said waypoint (B1), the second acceleration upstream corresponding to a first deceleration (T2) flown by the aircraft,
   whereby the speed profile (P1) is such that, from upstream to downstream along the aircraft flight path, an aircraft speed (V) is maintained at the speed constraint (V1) up to the waypoint (B1), then the first aircraft speed deceleration (T2) is performed from the waypoint (B1) up to the optimum speed (Vopt), the optimum speed (Vopt) being maintained up to the second deceleration (T4), which ends directly at the downstream speed limit (V2) reached at the given altitude level (A2) above ground, the optimum speed (Vopt) being less than the at least one speed constraint (V1), but greater than the downstream speed limit (V2);
   d) transmitting the speed profile (P1) to at least one user device comprising an automatic pilot system, and
   e) having the user device automatic pilot system guide or help guide the descent or approach of the aircraft using the speed profile (P1) as part of a vertical profile.

2. The method as claimed in claim 1, wherein the cost index takes into account a criterion or criteria of fuel consumption, flight time or fuel consumption and flight time.

3. The method as claimed in claim 1, wherein in step a), said speed constraint (V1) is automatically received from an onboard database.

4. The method as claimed in claim 1, wherein in step a), said speed constraint (V1) is input by a pilot of the aircraft.

5. The method as claimed in claim 1, wherein in step a), said speed constraint (V1) is automatically received from a control station external to the aircraft, via a data transmission link.

6. The method of claim 1, wherein the user device is further comprised of a display that displays at least the speed profile (P1).

7. The method of claim 1, wherein the optimum speed (Vopt) is maintained for as long as possible to optimize the criterion or criteria taken into account in the cost index which is used for calculating the optimum speed (Vopt).

8. A device for automatically determining at least one speed profile (P1) for a descent, an approach or a descent and an approach of an aircraft, the speed profile (P1) including a series of constant speed levels (T1, T3, T5) and deceleration segments (T2, T4), the device comprising:
   a calculation unit that determines the speed profile (P1) looking at a flight path of the aircraft in a direction upstream from a calculation starting point corresponding to the aircraft travelling at a downstream speed limit (V2) at a given altitude level (A2) above ground,
   a data transmitter that transmits the speed profile to at least one user device,
   at least one data receiver that receives at least one speed constraint (V1) for a given aircraft flight waypoint (B1), the aircraft having to fly at least at a speed corresponding to the speed constraint (V1) at said waypoint (B1), and
   the calculation unit determining at least one portion of the speed profile (P1) upstream and downstream of said waypoint (B1), by defining, looking at the upstream flight path of the aircraft, a first acceleration, which corresponds to a second deceleration (T4) flown by the aircraft, from the downstream speed limit (V2) imposed at the given altitude level (A2) above ground up to an optimum speed (Vopt) for optimizing a cost index for operation of the aircraft,
   the optimum speed (Vopt) being maintained up to a second acceleration, which corresponds to a first deceleration (T2) flown by the aircraft, the second acceleration also being defined looking at the upstream flight path of the aircraft, so as to end directly at said speed constraint (V1) at said given waypoint (B1) so that the speed profile (P1) is such that, from upstream to downstream aircraft flight wise, a speed (V) is maintained at said speed constraint (V1) up to said waypoint (B1), then the first deceleration (T2) is performed from said waypoint (B1) up to the optimum speed (Vopt), said optimum speed (Vopt) being maintained up to the second deceleration (T4) ending directly at said downstream speed limit (V2) reached at said given altitude level (A2), the optimum speed (Vopt) being less than the at least one speed constraint (V1), but greater than the downstream speed limit (V2),
   the at least one user device comprising an automatic pilot system, and
   the user device using the speed profile as part of a vertical profile to guide or help guide the descent, approach or descent and approach of the aircraft.

9. The device as claimed in claim 8, wherein the user device further comprises a display that displays at least said speed profile (P1).

10. The device of claim 8, wherein the user device is further comprised of a display that displays at least the speed profile (P1).

11. The device of claim 8, wherein the optimum speed (Vopt) is maintained for as long as possible to optimize the criterion or criteria taken into account in the cost index which is used for calculating the optimum speed (Vopt).

12. A flight management system of an aircraft comprising a device for automatically determining at least one speed profile (P1) for a descent, an approach or a descent and an approach of an aircraft, the speed profile (P1) including a series of constant speed levels (T1, T3, T5) and deceleration segments (T2, T4), the device comprising:
  a calculation unit that determines the speed profile (P1) looking at a flight path of the aircraft in a direction upstream from a calculation starting point corresponding to the aircraft travelling at a downstream speed limit (V2) at a given altitude level (A2) above ground,
  a data transmitter that transmits the speed profile to at least one user device,
  at least one data receiver that receives at least one speed constraint (V1) for a given aircraft flight waypoint (B1), the aircraft having to fly at least at a speed corresponding to the speed constraint (V1) at said waypoint (B1),
  the calculation unit determining at least one portion of the speed profile (P1) upstream and downstream of said waypoint (B1), by defining, looking at the upstream flight path of the aircraft, a first acceleration, which corresponds to a second deceleration (T4) flown by the aircraft, from the downstream speed limit (V2) imposed at the given altitude level (A2) above ground up to an optimum speed (Vopt) for optimizing a cost index for operation of the aircraft,
  the optimum speed (Vopt) being maintained up to a second acceleration, which corresponds to a first deceleration (T2) flown by the aircraft, the second acceleration also being defined looking at the upstream flight path of the aircraft, so as to end directly at said speed constraint (V1) at said given waypoint (B1) so that the speed profile (P1) is such that, from upstream to downstream aircraft flight wise, a speed (V) is maintained at said speed constraint (V1) up to said waypoint (B1), then the first deceleration (T2) is performed from said waypoint (B1) up to the optimum speed (Vopt), said optimum speed (Vopt) being maintained up to the second deceleration (T4) ending directly at said downstream speed limit (V2) reached at said given altitude level (A2), the optimum speed (Vopt) being less than the at least one speed constraint (V1), but greater than the downstream speed limit (V2),
  the at least one user device comprising an automatic pilot system, and
  the user device using the speed profile as part of a vertical profile to guide or help guide the descent, approach or descent and approach of the aircraft.

13. An aircraft comprising a device for automatically determining at least one speed profile (P1) for a descent, an approach or a descent and an approach of an aircraft, the speed profile (P1) including a series of constant speed levels (T1, T3, T5) and deceleration segments (T2, T4), the device comprising:
  a calculation unit that determines the speed profile (P1) looking at a flight path of the aircraft upstream from a calculation starting point corresponding to the aircraft travelling at a downstream speed limit (V2) at a given altitude level (A2) above ground,
  a data transmitter that transmits the speed profile to at least one user device,
  at least one data receiver that receives at least one speed constraint (V1) for a given aircraft flight waypoint (B1), the aircraft having to fly at least at a speed corresponding to the speed constraint (V1) at said waypoint (B1),
  the calculation unit determining at least one portion of the speed profile (P1) upstream and downstream of said waypoint (B1), by defining, looking at the upstream flight path of the aircraft, a first acceleration, which corresponds to a second deceleration (T4) flown by the aircraft, from the downstream speed limit (V2) imposed at the given altitude level (A2) above ground up to an optimum speed (Vopt) for optimizing a cost index for operation of the aircraft,
  the optimum speed (Vopt) being maintained up to a second acceleration, which corresponds to a first deceleration (T2) flown by the aircraft, the second acceleration also being defined looking at the upstream flight path of the aircraft, so as to end directly at said speed constraint (V1) at said given waypoint (B1) so that the speed profile (P1) is such that, from upstream to downstream aircraft flight wise, a speed (V) is maintained at said speed constraint (V1) up to said waypoint (B1), then the first deceleration (T2) is performed from said waypoint (B1) up to the optimum speed (Vopt), said optimum speed (Vopt) being maintained up to the second deceleration (T4) ending directly at said downstream speed limit (V2) reached at said given altitude level (A2), the optimum speed (Vopt) being less than the at least one speed constraint (V1), but greater than the downstream speed limit (V2),
  the at least one user device comprising an automatic pilot system, and
  the at least one user device using the speed profile as part of a vertical profile to guide or help to guide the descent, approach or descent and approach of the aircraft.

14. An aircraft comprising a flight management system of an aircraft including a device for automatically determining at least one speed profile (P1) for a descent, an approach or a descent and an approach of an aircraft, the speed profile (P1) including a series of constant speed levels (T1, T3, T5) and deceleration segments (T2, T4), the device comprising:
  a calculation unit that determines the speed profile (P1) looking at a flight path of the aircraft upstream from a calculation starting point corresponding to the aircraft travelling at a downstream speed limit (V2) at a given altitude level (A2) above ground,
  a data transmitter that transmits the speed profile to at least one user device,
  at least one data receiver that receives at least one speed constraint (V1) for a given aircraft flight waypoint (B1), the aircraft having to fly at least at a speed corresponding to the speed constraint (V1) at said waypoint (B1),
  the calculation unit determining at least one portion of the speed profile (P1) upstream and downstream of said waypoint (B1), by defining, looking at the upstream flight path of the aircraft, a first acceleration, which corresponds to a second deceleration (T4) flown by the aircraft, from the downstream speed limit (V2) imposed at the given altitude level (A2) above ground up to an optimum speed (Vopt) for optimizing a cost index for operation of the aircraft, the optimum speed (Vopt) being maintained up to a second acceleration, which corresponds to a first deceleration (T2) flown by the aircraft, the second acceleration also being defined looking at the upstream flight path of the aircraft, so as to end directly at said speed constraint (V1) at said given waypoint (B1) so that the speed profile (P1) is such that, from upstream to downstream aircraft flight wise, a speed (V) is maintained at said speed constraint (V1) up to said waypoint (B1), then the first deceleration (T2) is performed from said waypoint (B1) up to the optimum speed (Vopt), said optimum speed (Vopt) being maintained up to the second deceleration (T4) ending directly at said downstream speed limit (V2) reached at said given altitude level (A2), the optimum speed (Vopt) being less than the at least one speed constraint (V1), but greater than the downstream speed limit (V2), the at least one user device comprising an automatic pilot system, and the at least one user device using the speed profile as part of a vertical profile to guide or help to guide the descent, approach or descent and approach of the aircraft.

15. A method for automatically determining a speed profile for a descent, an approach or a descent and an approach of an aircraft on which a speed constraint of the "AT" type or the "AT or ABOVE" type is imposed, the speed profile including first, second and third constant speed levels and first and second deceleration segments, the speed profile being determined looking at a flight path of the aircraft upstream from a calculation starting point corresponding to the aircraft travelling at a downstream speed limit (V2) at a given altitude level (A2) above ground, the second constant speed level being less than the first constant speed level, but greater than the third constant speed level, the method comprising:

a) receiving at least one speed constraint for a given aircraft flight waypoint, the aircraft having to fly at least at a speed corresponding to the speed constraint at the waypoint;

b) determining at least one portion of the speed profile upstream and downstream of the waypoint by defining, looking at the upstream flight path of the aircraft, a first acceleration, which corresponds to a second deceleration flown by the aircraft, from the downstream speed limit imposed at the given altitude level above ground up to an optimum speed (Vogt) for optimizing a cost index for operating the aircraft, the optimum speed being maintained up to a second acceleration, which corresponds to a first deceleration flown by the aircraft, the second acceleration also being defined looking at the upstream flight path of the aircraft, so as to end directly at the speed constraint at the waypoint, so that the portion of the speed profile is such that, from upstream to downstream, the speed of the aircraft is maintained at the speed constraint up to the waypoint, then the first deceleration is performed from the waypoint up to the optimum speed, the optimum speed being maintained up to the second deceleration ending directly at the downstream speed limit reached at the given altitude level above ground, the optimum speed being less than the at least one speed constraint, but greater than the downstream speed limit), the optimum speed being less than the at least one speed constraint, but greater than the downstream speed limit;

c) transmitting the speed profile (P1) to at least one user device comprising an automatic pilot system, and d) having the user device use the speed profile as part of a vertical profile to guide or help guide the descent, approach or descent and approach of the aircraft.

16. The method of claim 15, wherein the user device is further comprised of a display for displaying at least the speed profile.

17. The method as claimed in claim 15, wherein the cost index takes into account a criterion or criteria of fuel consumption, flight time or fuel consumption and flight time.

18. The method of claim 15, wherein the optimum speed (Vopt) is maintained for as long as possible to optimize the criterion or criteria taken into account by the cost index which is used for calculating the optimum speed.

* * * * *